United States Patent [19]

Damen et al.

[11] 4,095,122
[45] June 13, 1978

[54] TUNABLE INFRARED AND FAR-INFRARED SOURCE BY FOUR-PHOTON MIXING

[75] Inventors: Theodoar Charlouis Damen, Colts Neck; Erich Gornik, Red Bank; Van-Tran Nguyen, Holmdel; Chandra Kumar Naranbhai Patel, Summit, all of N.J.

[73] Assignee: Bell Telephone Laboratories, Incorporated, Murray Hill, N.J.

[21] Appl. No.: 821,699

[22] Filed: Aug. 4, 1977

[51] Int. Cl.² ............................................. H02M 5/04
[52] U.S. Cl. .................................................. 307/88.3
[58] Field of Search ......................................... 307/88.3

[56] References Cited

U.S. PATENT DOCUMENTS 4,011,462  3/1977  Piltch et al. ......................... 307/88.3

OTHER PUBLICATIONS

Kramer et al., "Physical Review B," vol. 9, No. 4, Feb. 1974, pp. 1853–1856.

*Primary Examiner*—Rudolph V. Rolinec
*Assistant Examiner*—Darwin R. Hostetter
*Attorney, Agent, or Firm*—Daniel D. Dubosky

[57] ABSTRACT

The invention relates to a high-power tunable infrared source employing a four-photon mixing process, with three input lasers, in which process the output power is resonantly enhanced by exciton states in the conversion medium.

4 Claims, 2 Drawing Figures

TUNABLE INFRARED AND FAR-INFRARED SOURCE BY FOUR-PHOTON MIXING

BACKGROUND OF THE INVENTION

Isotope separation by means of laser irradiation has been extensively discussed and is currently the subject of intense interest, especially with regard to the separation of uranium isotopes. This work has been hampered, however, by the lack of a suitable tunable laser working in the relevant frequency range (near 16 microns).

One work that has come to our attention involves a nonresonant three-photon mixing process $\omega_3 = \omega_1 - \omega_2$, where $\omega_1$ is generated by a CO laser and $\omega_2$ is generated by a $CO_2$ laser (U.S. Pat. No. 4,011,462). This work suffers from the drawback that the output frequency cannot be varied continuously.

Another previous work is a physical measurement of the exciton structure of CuCl that involved a different four-photon optical mixing process in which all of the input frequencies were in the very near infrared ("Interference of Third-Order Light Mixing and Second-Harmonic Exciton Generation in CuCl," Physical Review, 9, 1853 (1974)). This process involved the use of only two input frequencies ($\omega_3 = 2\omega_1 - \omega_2$) and was therefore limited to the low power afforded by single resonance enhancement. This method would also have difficulty in providing phase-matching in the frequency range of interest, which is quite far from the visible.

SUMMARY OF THE INVENTION

The invention relates to an apparatus for generating tunable infrared radiation by means of a four-photon nonlinear mixing process ($\omega_4 = \omega_1 + \omega_2 - \omega_3$) in a birefringent crystal, using three input lasers, two in the visible and one in the infrared.

One feature of the invention is the use of readily tunable, powerful visible lasers to provide flexibility in tuning the output frequency.

Another feature of the invention is the choice of input frequencies that are readily suited to phase matching, by balancing visible and infrared against each other.

Yet another feature of the invention is the use of double resonance enhancement for maximum output power.

Yet another feature of the invention is the use of a birefringent crystal conversion medium to provide higher power by phase matching.

Yet another feature of the invention is the selection of a crystal having exciton states at convenient energy levels.

DETAILED DESCRIPTION

Figure 1:
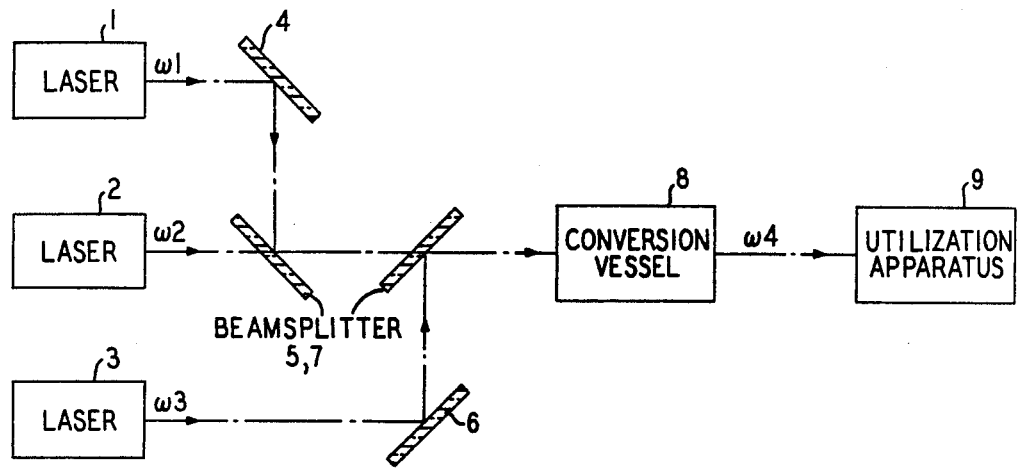
FIG. 1 shows in partially pictorial, partially schematic form a radiation source constructed according to the invention.

In FIG. 1, lasers 1, 2 and 3 generate the input optical beams at frequencies $\omega_1$, $\omega_2$, and $\omega_3$ respectively, which beams are combined collinearly by mirrors 4 and 6 and beamsplitters 5 and 7. The combined beams enter conversion vessel 8, illustratively a cryogenic dewar supporting a crystal of CdS at 2° K. The crystal is oriented at a predetermined angle with respect to the beams so that the crystal's birefringence may be used to provide phase-matching between the input and output radiation. The output radiation then continues to utilization device 9, illustratively an isotope separation apparatus.

Figure 2:
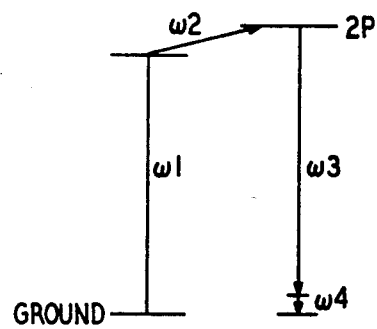
FIG. 2 shows an energy level diagram of CdS, indicating the exciton energy levels employed in the embodiment of FIG. 1.

An energy level diagram of CdS illustrating the states employed for resonance enhancement is shown in FIG. 2. Typically, $\omega_1$ and $\omega_3$ are in the visible frequency range because visible photons have energies that are comparable to the energy gaps between the ground state of the system and the low-lying exciton states. Illustratively, $\omega_1$ and $\omega_3$ are generated by dye lasers, and $\omega_1$ is tuned near the ground — 1s state transition frequency. Also, $\omega_2$ is typically generated by a $CO_2$ laser, the energy of which is close to the 1s–2p energy gap. As a result of this careful selection of input frequencies, it is possible to provide a doubly resonant-enhanced output. The frequency $\omega_1$ is selected to be close to the frequency associated with the transition between the ground state and the 1s exciton state, and $\omega_2$ is close to the energy gap between the 1s and 2p states, so that greater resonance enhancement is provided than was possible with prior art apparatus that employed input beams that were all in the infrared or with apparatus that used the process $\omega_3 = 2\omega_1 - \omega_2$.

Phase-matching is required in mixing processes because the output frequency travels at a different speed through the conversion medium than do the input frequencies, and this speed difference will result in destructive interference if it is not corrected.

Providing phase-matching consists essentially of constructing an apparatus in which the equation $$n_1\omega_1 + n_2\omega_2 = n_3\omega_3 + n_4\omega_4 \quad (1)$$

is satisfied, where $n_i$ is the frequency-dependent index of refraction of the conversion medium at $\omega_i$. In the present invention, the equation is solved by rotating the conversion medium so that the indices of refraction are altered by the crystal's birefrigence to values that satisfy the equation. The use of two visible frequencies and one infrared frequency comparable to the output frequency renders this task easier and results in phase matching with little difficulty, simply because the symmetry provided by the two visible and two infrared beams provides near-balance automatically. In this case, the phase-matching equation becomes:

$$n_v\omega_v + n_{IR}\omega_{IR} = n_v'\omega_v' + n_{IR}'\omega_{IR}'. \quad (2)$$

In contrast, the prior art apparatus referred to above used CuCl, an isotropic crystal, and achieved phase-matching by orienting the two input beams at a predetermined angle; a method which is limited in flexibility and which necessarily results in the interaction region being limited to the overlap of the beams. With two beams, both in the visible or very near infrared, the mismatch in the phase-matching equation that must be corrected by the beam position tends to be substantial:

$$2n_v\omega_v = n_v'\omega_v' + n_{IR}\omega_{IR} \quad (3)$$

with the result of imperfect phase-matching and reduced output power.

What is claimed is:

1. An apparatus for generating tunable infrared radiation comprising first, second and third input lasers generating input beams of frequency $\omega_1$, $\omega_2$ and $\omega_3$, respectively a nonlinear interaction medium comprising a crystal having exciton states, means for directing said input beams collinearly into said nonlinear interaction medium, whereby an output frequency $\omega_4$ is generated, where $$\omega_4 = \omega_1 + \omega_2 - \omega_3,$$

in which apparatus $\omega_1$ and $\omega_2$ are selected such that $\omega_1$ is close to the frequency of a single-photon exciton state and the sum of $\omega_1$ and $\omega_2$ is very close to the frequency of a two photon exciton state, so that the output power of frequency $\omega_4$ is resonantly enhanced by both of said exciton states.

2. An apparatus according to claim 1 in which said nonlinear interaction medium comprises a birefringent crystal.

3. An apparatus according to claim 2 in which said birefringent crystal is formed from elements in columns II and VI of the Periodic Table of the Elements.

4. An apparatus according to claim 3 in which said birefringent crystal is formed from cadmium sulphide.

* * * * *

UNITED STATES PATENT AND TRADEMARK OFFICE
CERTIFICATE OF CORRECTION

PATENT NO. : 4,095,122

DATED : June 13, 1978

INVENTOR(S) : Theodoor C. Damen, Erich Gornik, Van-Tran Nguyen and Chandra K. N. Patel It is certified that error appears in the above-identified patent and that said Letters Patent are hereby corrected as shown below:

On the Introductory sheet, line 4, "[75] Inventors: Theodoar Charlouis Damen, Colts" should read --[75] Inventors: Theodoor Charlouis Damen, Colts--.

*Signed and Sealed this*

*Twenty-fifth* Day of *March 1980*

[SEAL]

*Attest:*

SIDNEY A. DIAMOND

*Attesting Officer*     *Commissioner of Patents and Trademarks*